US009986155B2

(12) United States Patent
Chang et al.

(10) Patent No.: US 9,986,155 B2
(45) Date of Patent: May 29, 2018

(54) IMAGE CAPTURING METHOD, PANORAMA IMAGE GENERATING METHOD AND ELECTRONIC APPARATUS

(71) Applicant: HTC Corporation, Taoyuan City (TW)

(72) Inventors: Edward Chang, Taoyuan County (TW); Tung-Peng Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 235 days.

(21) Appl. No.: 14/477,882

(22) Filed: Sep. 5, 2014

(65) Prior Publication Data
US 2016/0073021 A1 Mar. 10, 2016

(51) Int. Cl.
*H04N 5/232* (2006.01)
*G06T 3/40* (2006.01)
*G06T 5/50* (2006.01)
*H04N 5/262* (2006.01)
*G06T 7/181* (2017.01)

(52) U.S. Cl.
CPC ......... *H04N 5/23238* (2013.01); *G06T 3/403* (2013.01); *G06T 3/4038* (2013.01); *G06T 5/50* (2013.01); *G06T 7/181* (2017.01); *H04N 5/23222* (2013.01); *H04N 5/2624* (2013.01); *G06T 2200/32* (2013.01); *G06T 2207/10004* (2013.01); *G06T 2207/20221* (2013.01)

(58) Field of Classification Search
CPC . G06T 2207/20221; G06T 2207/20136; G06T 2207/10004; G06T 3/4038; G06T 3/403; G06T 5/50; G06T 2200/32; H04N 5/23238; H04N 5/2624; H04N 5/23222
See application file for complete search history.

(56) References Cited

U.S. PATENT DOCUMENTS 6,516,099 B1 * 2/2003 Davison .................. G06T 7/596
345/419
6,647,146 B1 * 11/2003 Davison .................. G06T 7/564
358/1.9
(Continued)

FOREIGN PATENT DOCUMENTS

CN   101490617 A   7/2009
CN   102023167 A   4/2011
(Continued)

OTHER PUBLICATIONS

Corresponding Taiwanese Office Action that these art references were dated Jan. 28, 2016.
(Continued)

*Primary Examiner* — Sath V Perungavoor
*Assistant Examiner* — Philip Dang
(74) *Attorney, Agent, or Firm* — CKC & Partners Co., Ltd.

(57) ABSTRACT

An image capturing method, a panorama image generating method and an electronic apparatus are provided in this disclosure. The image capturing method includes steps of: calculating feature points within a first image shot by the electronic apparatus; calculating a maximal rotation angle of the electronic apparatus rotating along a direction according to a distribution of the feature points within the first image; and, shooting a second image automatically when the electronic apparatus has been rotated through the maximal rotation angle along the direction.

19 Claims, 6 Drawing Sheets

(56) References Cited

U.S. PATENT DOCUMENTS

| | | | | |
|---|---|---|---|---|
| 6,668,082 | B1* | 12/2003 | Davison | G06T 7/55 345/419 |
| 6,750,860 | B1* | 6/2004 | Shum | G06T 3/4007 345/419 |
| 6,947,076 | B1 | 9/2005 | Kitaguchi et al. | |
| 6,985,175 | B2* | 1/2006 | Iwai | G01C 3/08 348/187 |
| 7,023,473 | B2* | 4/2006 | Iwai | G01C 3/08 348/187 |
| 7,224,386 | B2* | 5/2007 | Kang | G06T 5/006 348/207.99 |
| 7,565,029 | B2* | 7/2009 | Zhou | G06T 7/80 382/154 |
| 7,974,441 | B2* | 7/2011 | Yamada | G06K 9/00228 382/103 |
| 8,024,144 | B2* | 9/2011 | Kludas | G01C 15/00 382/100 |
| 8,199,221 | B2* | 6/2012 | Yoshizumi | H04N 1/2112 348/222.1 |
| 8,310,563 | B2* | 11/2012 | Yamashita | H04N 5/23238 348/239 |
| 8,320,708 | B2* | 11/2012 | Kurzweil | G06T 5/006 356/138 |
| 8,379,078 | B2* | 2/2013 | Yamashita | H04N 5/232 348/36 |
| 8,498,448 | B2* | 7/2013 | Feris | G06K 9/00771 348/169 |
| 8,736,666 | B2* | 5/2014 | Ishida | H04N 5/23238 348/218.1 |
| 8,768,098 | B2* | 7/2014 | Zhang | G06T 3/4038 348/36 |
| 2005/0206743 | A1 | 9/2005 | Sim et al. | |
| 2007/0081081 | A1 | 4/2007 | Cheng | |
| 2008/0170124 | A1* | 7/2008 | Hatanaka | G06T 5/004 348/208.4 |
| 2009/0284582 | A1 | 11/2009 | Mei et al. | |
| 2010/0033553 | A1 | 2/2010 | Levy | |
| 2010/0141735 | A1* | 6/2010 | Yamashita | H04N 5/232 348/36 |
| 2010/0194852 | A1 | 8/2010 | Tseng et al. | |
| 2011/0050960 | A1 | 3/2011 | Niemi et al. | |
| 2011/0128413 | A1* | 6/2011 | Tsai | G06K 9/00228 348/231.99 |
| 2011/0281190 | A1* | 11/2011 | Skinkle | H01M 8/04014 429/433 |
| 2011/0283190 | A1* | 11/2011 | Poltorak | G10L 13/033 715/716 |
| 2012/0002075 | A1* | 1/2012 | Yoshizumi | H04N 5/2251 348/229.1 |
| 2012/0262621 | A1* | 10/2012 | Sato | G02B 13/06 348/335 |
| 2012/0275655 | A1* | 11/2012 | Uchida | H04N 5/213 382/107 |
| 2012/0314123 | A1* | 12/2012 | Lee | H04N 5/23222 348/362 |
| 2013/0243250 | A1* | 9/2013 | France | G01C 15/00 382/103 |
| 2013/0329072 | A1* | 12/2013 | Zhou | G06T 3/4038 348/222.1 |
| 2014/0002439 | A1* | 1/2014 | Lynch | G09B 29/007 345/419 |
| 2014/0218555 | A1* | 8/2014 | Kuo | G11B 27/034 348/220.1 |

FOREIGN PATENT DOCUMENTS

| | | |
|---|---|---|
| CN | 103179347 A | 6/2013 |
| EP | 2 747 418 A1 * | 12/2013 |
| JP | 2011065371 A | 3/2011 |
| JP | 2014192829 A | 10/2014 |
| TW | 201030637 A | 8/2010 |
| TW | 201200960 A | 1/2012 |
| TW | 201335856 A | 9/2013 |

OTHER PUBLICATIONS

Corresponding European Office Action that these art references were dated Jan. 5, 2016.
Corresponding European Search Report that these art references were dated Dec. 14, 2015.
Corresponding European Communication dated Mar. 27, 2017.
Corresponding Chinese office action dated Dec. 7, 2017.

* cited by examiner

IMAGE CAPTURING METHOD, PANORAMA IMAGE GENERATING METHOD AND ELECTRONIC APPARATUS

BACKGROUND

Field of Invention

The present application relates to an image capturing method. More particularly, the present application relates to an image capturing method for generating a panorama image.

Description of Related Art

Electronic devices, such as digital cameras, smart phones and tablet computers, have become necessary products in a modern society. With aforesaid electronic devices, users can easily records surrounding scenarios or important events in their daily life. However, camera lens of the electronic devices have some limitations (e.g., a capability of how wide that one image can cover is limited by a wide-angle end of the camera lens). When the users want to shoot a magnificent scenario, a tall building, folks on a grand plaza, a huge artwork or a group photo, it is hard to cover the whole topic in one photograph.

On high-end photography equipments, the camera lens might be replaced with ultra-wide angle lens or fish-eye lens to capture a wider scenario. However, lens or camera modules are fixed and irreplaceable in most digital cameras, smart phones and tablet computers.

Recently, a solution for shooting a wide angle image is developed by generating a panorama image based on a software procedure. In general, when the panorama mode is activated, the user manually shoots multiple source images and these images can be jointed as a panorama image.

In a common case, views of aforesaid source images are adjusted by the user manually, and the source images are processed and jointed together to form the panorama image. The user is required to have certain skills in aforesaid case. For example, the user must decide an appropriate rotation angle for shooting another image from the latest captured image. If the rotation angle is inappropriate, it will cause some difficulties while jointing the images (e.g., a relationship between two images to be jointed is not clear), or it will cause a result of the panorama image below expectations (e.g., some obvious bugs existed on the jointing region between two images).

SUMMARY

An aspect of the disclosure is to provide an image capturing method which is suitable for an electronic apparatus. The image capturing method include following steps. Feature points within a first image shot by the electronic apparatus are calculated. A maximal rotation angle of the electronic apparatus rotating along a direction is calculated according to a distribution of the feature points within the first image. A second image is shot automatically when the electronic apparatus has been rotated by the maximal rotation angle along the direction.

Another aspect of the disclosure is to provide a panorama image generating method which is suitable for an electronic apparatus. The panorama image generating method include following steps. Feature points within a first image shot by the electronic apparatus are calculated. A maximal rotation angle of the electronic apparatus rotating along a direction is calculated according to a distribution of the feature points within the first image. A second image is shot automatically when the electronic apparatus has been rotated by the maximal rotation angle along the direction. The first image and the second image are utilized to be jointed as a panorama image.

Another aspect of the disclosure is to provide an electronic apparatus, which includes a motion sensor, an image capturing unit, a display unit and a processing unit. The motion sensor is configured for sensing an orientation of the electronic apparatus. The display unit is configured for displaying a user interface. The processing unit is coupled with the motion sensor, the image capturing unit and the display unit.

When the image capturing unit shoots a first image, the processing unit is configured for calculating a plurality of feature points within the first image, calculating a maximal rotation angle of the electronic apparatus rotating along a direction according to a distribution of the feature points within the first image, and prompting a relative position of the maximal rotation angle on the user interface.

When the motion sensor detects that the electronic apparatus has been rotated by the maximal rotation angle along the direction, the processing unit is configured for driving the image capturing unit to shoot a second image. The first image and the second image are configured to be jointed as a panorama image.

Based on aforesaid embodiments, the mage capturing method, the panorama image generating method and the electronic apparatus are capable of calculating the distribution of the feature points on the current image, and acquiring maximal rotation angles toward different directions according to the distribution of the feature points around edges of the current image toward different directions. It helps the user to rotate the electronic apparatus to the optimal position, to ensure the outcome of the jointed result, and to form the panorama image with the largest perspective coverage by less times of image capturing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
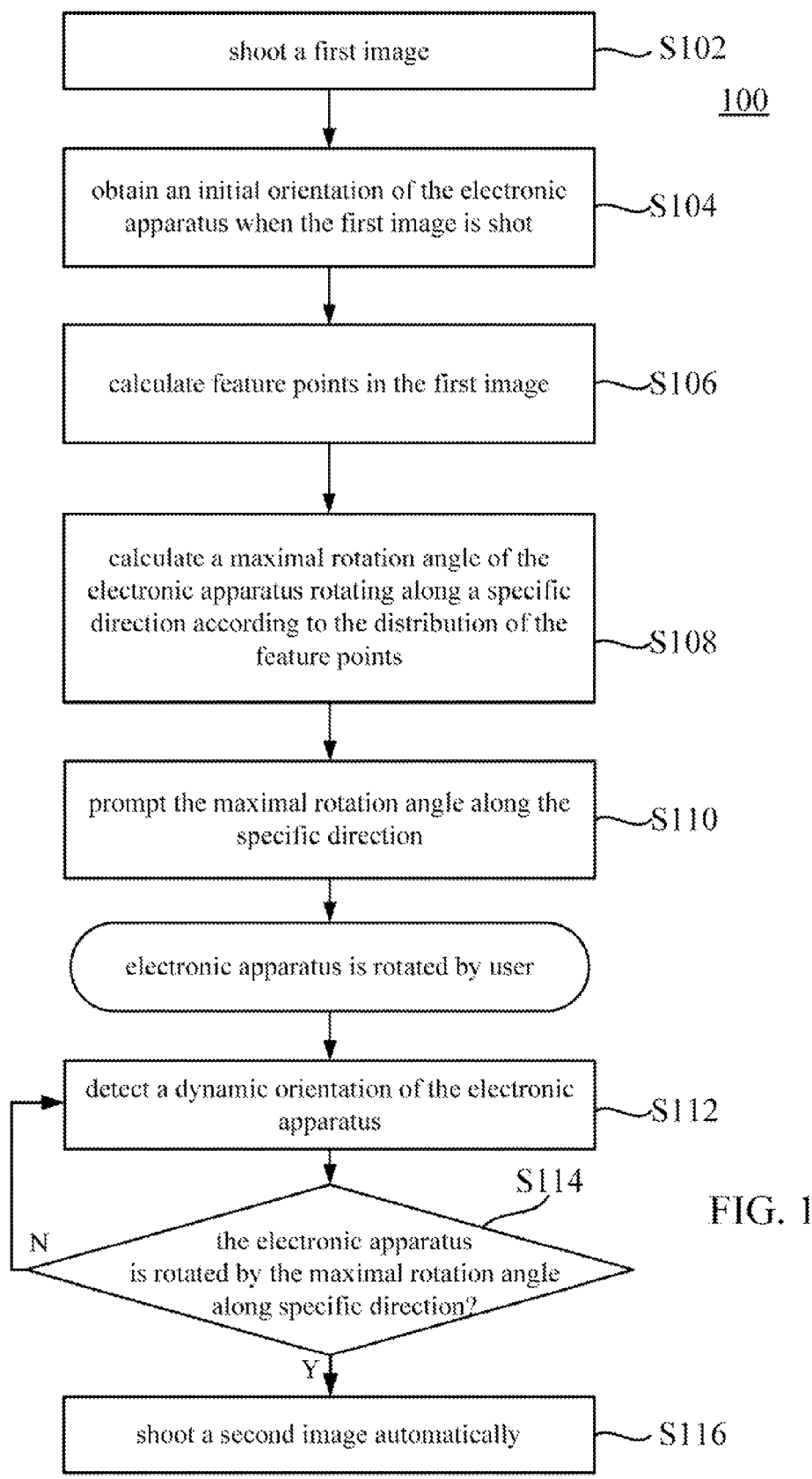
FIG. 1 is a flow diagram illustrating an image capturing method according to an embodiment of this disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a flow diagram illustrating an image capturing method 100 according to an embodiment of this disclosure. In the embodiment, the image capturing method 100 can be utilized to generate a panorama image. In other words, several images captured by the image capturing method 100 can be jointed or stitched as the panorama image corresponding to a large visual angle.

Figure 2:
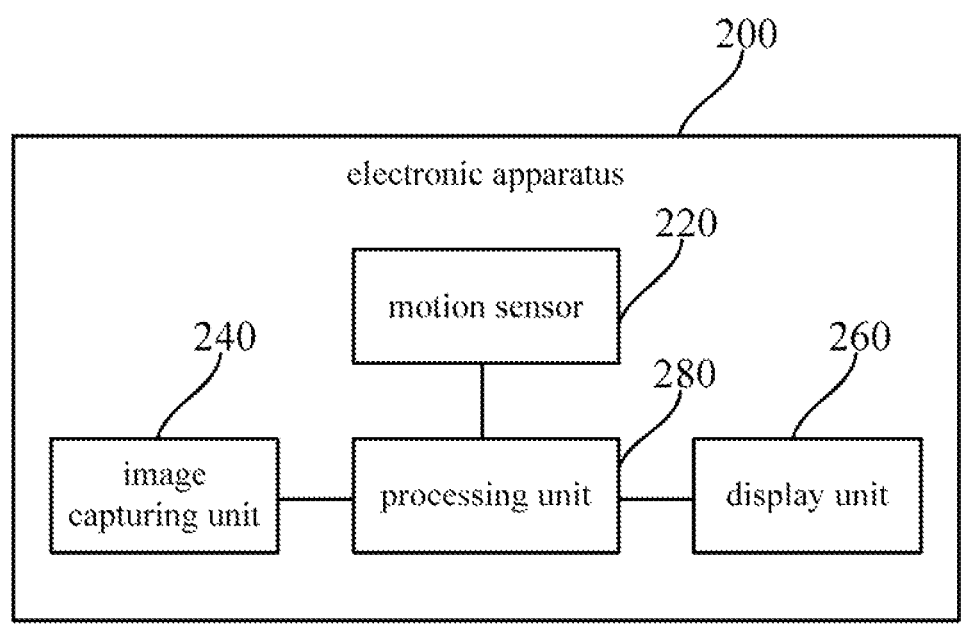
FIG. 2 is a functional block diagram illustrating an electronic apparatus according to an embodiment of the disclosure.

The image capturing method 100 in the embodiment is suitable for an electronic apparatus. Reference is also made to FIG. 2, which is a functional block diagram illustrating an electronic apparatus 200 according to an embodiment of the disclosure. As shown in FIG. 2, the electronic apparatus 200 includes a motion sensor 220, an image capturing unit 240, a display unit 260 and a processing unit 280. The processing unit 280 is coupled with the motion sensor 220, the image capturing unit 240 and the display unit 260.

The image capturing unit 240 in some embodiments includes lens, an optical module and an image sensing component. Detail structures within the image capturing unit 240 are well known by a person in the art and not to be further discussed here. The image capturing unit 240 is disposed on one side surface of the electronic apparatus 200 and located facing a direction toward a scenario of interest. The electronic apparatus 200 can be a digital camera, a digital single-lens reflex (DSLR) camera, a digital interchangeable-lens camera (DILC), a camera phone, a smart phone or any other equivalent electronic device with the image capturing unit 240.

The motion sensor 220 is configured for sensing an orientation of the electronic apparatus 200. For example, the motion sensor 220 senses at least one of a horizontal deflection vector, a vertical deflection vector of a casing of the electronic apparatus 200 and/or a deflection angle of the electronic apparatus 200 relative to the magnetic north. In other words, the motion sensor 220 is able to acknowledge a captured orientation corresponding to a field of view captured by the image capturing unit 240 when the image capturing unit 240 is triggered to shoot an image. During a view-finding period (e.g., a live pre-view image sensed by the image capturing unit 240 is dynamically updated on the display unit 260), the motion sensor 220 is able to sense a dynamic orientation which the image capturing unit 240 currently faces. In practices, the motion sensor 220 includes at least one of a gyro sensor, an electronic compass and a gravity sensor (G-sensor).

The display unit 260 is configured for displaying a user interface (UI). The user interface is configured to show captured images previously captured by the image capturing unit 240, a live pre-view image during the view-finding period, related photography information (e.g., aperture, shutter speed, power, time, focal length, etc) and other usage prompts.

As the embodiment shown in FIG. 1, the image capturing method 100 firstly executes step S102 to shoot a first image by the image capturing unit 240. In the embodiment, when the first image is shot, the image capturing method 100 also executes step S104 to obtain an initial orientation of the electronic apparatus 200 by the motion sensor 220, which is the three-directional orientation of the electronic apparatus 200 when the first image is shot.

Figure 3A:
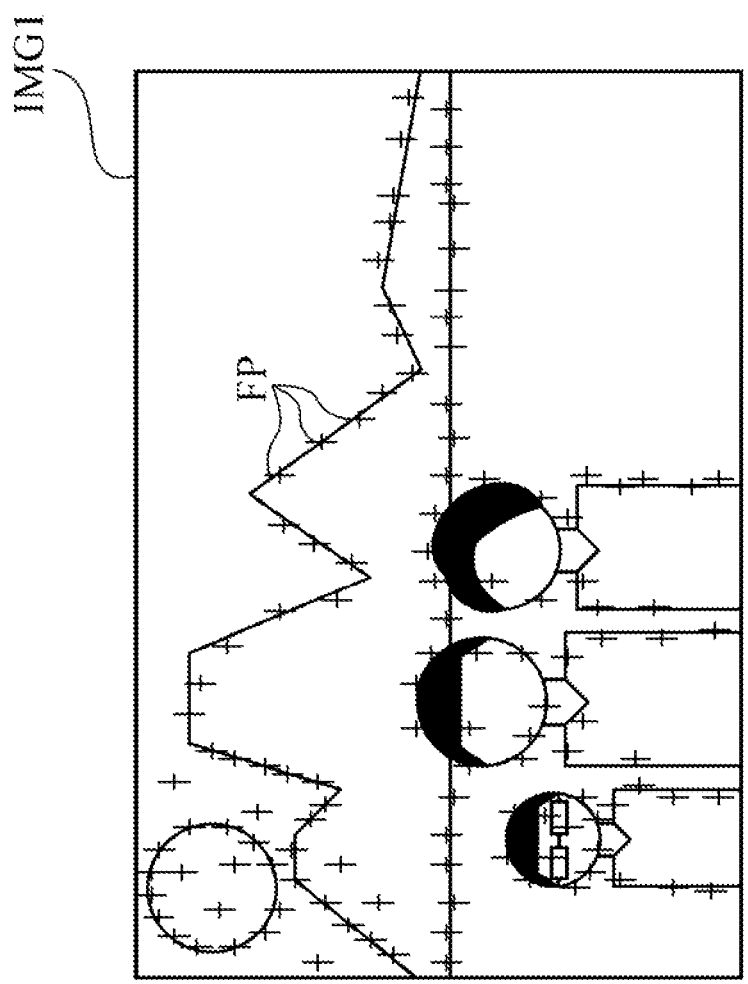
FIG. 3A is a schematic diagram illustrating a first image shot by the electronic apparatus according to an embodiment of the disclosure.
Figure 3B:
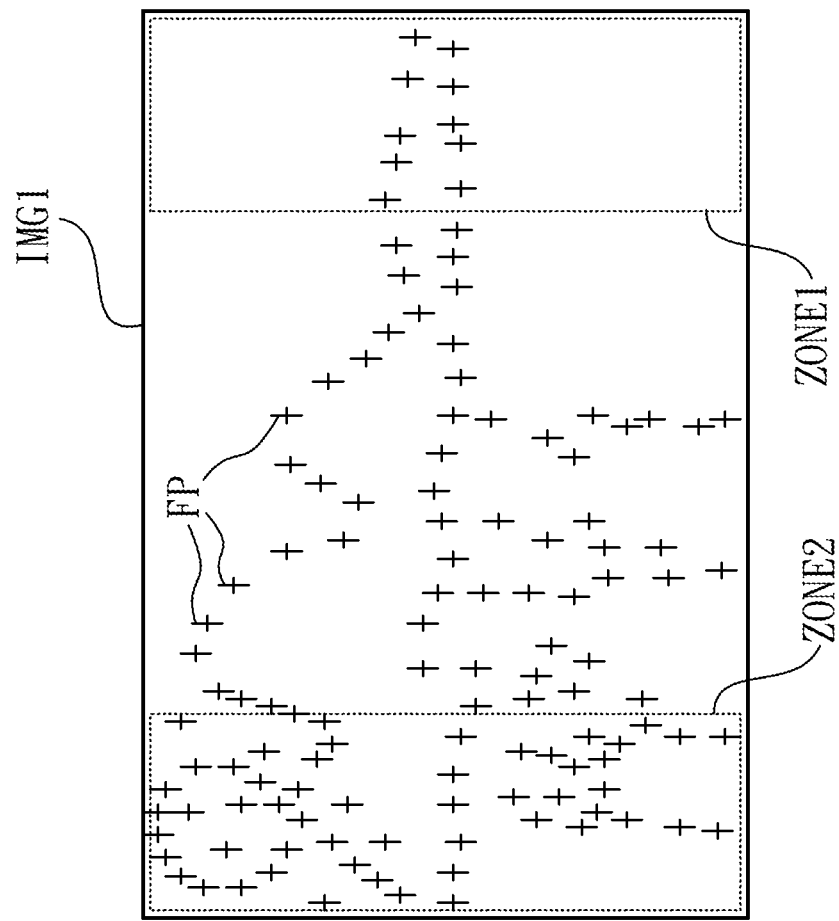
FIG. 3B is a schematic diagram illustrating the feature points in the first image in the embodiment of FIG. 3A.

Afterward, the image capturing method 100 executes step S106 to calculate a plurality of feature points in the first image. Reference is made to FIG. 3A and FIG. 3B. FIG. 3A is a schematic diagram illustrating a first image IMG1 shot by the electronic apparatus 200 according to an embodiment of the disclosure. FIG. 3B is a schematic diagram illustrating the feature points FP in the first image IMG1 in the embodiment of FIG. 3A. As the example shown in FIG. 3A, contents of the first image IMG1 shot by step S106 may include several objects, such as people, backgrounds, vehicles, trees, components, shapes, color blocks, etc. In an embodiment, the processing unit 280 performs some image processes according to the contents of the first image IMG1, so as to identify the features points FP existed in the first image IMG1. In this embodiment, there are many feature points within the first image IMG1, and the distribution of the feature points FP is illustrated as shown in FIG. 3B.

In practical applications of image processing, there are many ways to identify the feature points from contents of the image, such as a facial feature recognition algorithm, a fingerprint recognition algorithm, an edge detection algorithm, a corner detection algorithm, a block detection algorithm, a ridge detection algorithm and other equivalent algorithms to extract feature points from images. The image capturing method in this disclosure utilizes one algorithm or combines multiple algorithms to extract the feature points FP from the first image IMG1. The feature points FP shown in FIG. 3B (extracted from FIG. 3A) in the embodiment are mainly detected by the edge detection algorithm for an exemplary demonstration, but the disclosure is not limited to the specific algorithm.

In addition, the feature points FP in this disclosure indicates the locations of feature patterns extracted from the image by image processing algorithms, but the each of the feature points FP is not limited to one singular point, one singular spot or one set of coordinates. Each of the feature points FP can also be a region or an area consisted of multiple pixels in the image.

The image capturing method 100 executes step S108 for calculating a maximal rotation angle of the electronic apparatus 200 rotating along a specific direction according to the distribution of the feature points FP within the first image IMG1. The following paragraphs will explain in details about how to calculate the maximal rotation angle according to the distribution of the feature points FP within the first image IMG1.

As the example shown in FIG. 3A and FIG. 3B, a part ZONE1 on the right side of the first image IMG1 has less variation, more disperse objects or less distinguishable features; on the other hand, another part ZONE2 on the left side of the first image IMG1 has snore variation, more concentrated objects or more distinguishable features. In this case, the part ZONE1 on the right side of the first image IMG1 has a lower density of the feature points FP, and the part ZONE2 on the left side of the first image IMG1 has a higher density of the feature points FP.

When the user rotates the electronic apparatus 200 and tries to shoot another image, which is utilized to be jointed with the origin image (i.e., the first image) to from a panorama image covering a wider visual angle (by jointing/stitching these two images), the user must decide a suitable degree of the rotation angle for rotating the electronic apparatus 200.

If the rotation angle adopted by the user is too large, another image will be barely overlapped with the original image (or even not overlapped at all), and the electronic apparatus 200 will not be able to figure out the correspondence between these two images through the image processing algorithm, such that the image jointing/stitching will be failed. If the rotation angle adopted by the user is too small, another image will be overlapped with the original image by a large proportion (or even these images are similar to each other without differences of visual angles), and the electronic apparatus 200 must shoot many new images to cover different visual angles. In this case, the user needs to shot many more images and repeatedly perform many times of image jointing or stitching, such that the performance will be much lower when the rotation angle is too small.

Figure 4:
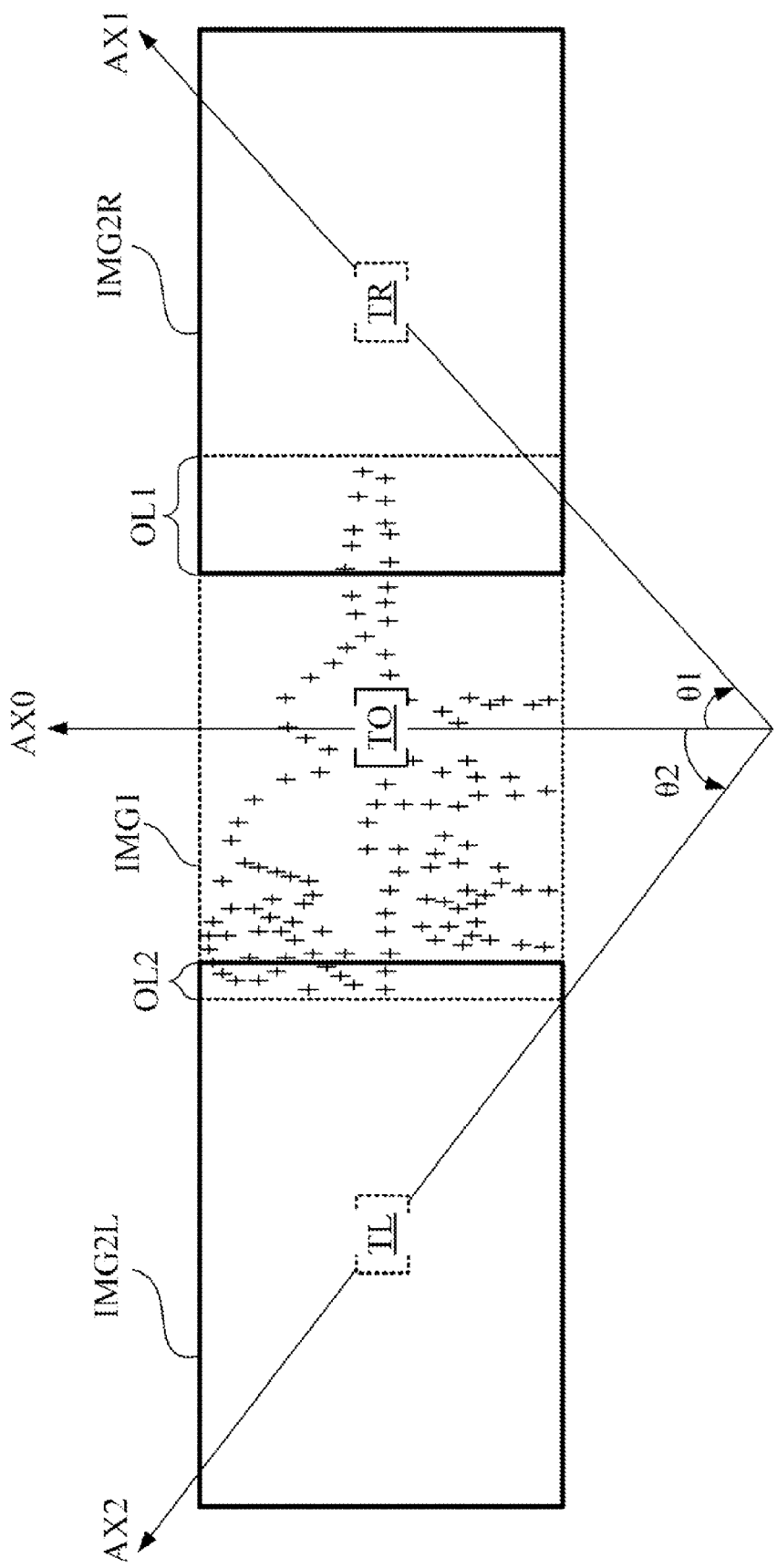
FIG. 4 is a schematic diagram illustrating the user rotates the electronic apparatus toward different directions and shoots different second images.

Reference is also made to FIG. 4, which is a schematic diagram illustrating the user rotates the electronic apparatus 200 toward different directions and shoots different second images IMG2R and IMG2L. In aforesaid step S108, the maximal rotation angle of the electronic apparatus 200 rotating along the specific direction is calculated according to a density of the feature points FP around a side edge of the first image IMG1 corresponding to the specific direction.

It is assumed that the user rotates to the right side for shooting the next image for jointing with the first image IMG1. Step S108 further involves counting a number of the feature points FP covered by an overlapping portion OL1 (as shown in FIG. 4) between the first image IMG1 and the second image IMG2R scheduled to be shot, and keeping the number of the feature points FP covered by the overlapping portion OL1 between the first image IMG1 and the second image IMGR above a threshold value. In the embodiment, it is assumed that the threshold value is at least ten feature points. In other words, the processing unit 280 requires ten feature points to perform a valid image jointing/stitching between the first image IMG1 and the second image IMG2R.

Therefore, the processing unit 280 is able to determine how large of the overlapping portion OL1 will be enough to possess ten feature points around the side edge on the right side of the first image IMG1. Once the size of the overlapping portion OL1 is determined, the maximal rotation angle θ1 in respect to the electronic apparatus 200 is rotated to the right side is obtained, such that the location of the second image IMG2R is obtained corresponding to the maximal rotation angle θ1.

On the other hand, it is assumed that the user rotates to the left side for shooting the next image for jointing with the first image IMG1. Step S108 further involves counting a number of the feature points FP covered by another overlapping portion OL2 (as shown in FIG. 4) between the first image IMG1 and another second image IMG2L scheduled to be shot, and keeping the number of the feature points FP covered by the overlapping portion OL2 between the first image IMG1 and the second image IMGL above ten feature points.

Therefore, the processing unit 280 is able to determine how large of the overlapping portion OL2 will be enough to possess ten feature points around the side edge on the left side of the first image IMG1. Once the size of the overlapping portion OL2 is determined, the maximal rotation angle θ2 in respect to the electronic apparatus 200 is rotated to the left side is obtained, such that the location of the second image IMG2L is obtained corresponding to the maximal rotation angle θ2.

As shown in FIG. 4, the density of the feature points FP around the side edge of the first image IMG1 to the right side is lower, such that the overlapping portion OL1 is required to be larger to match the basic threshold for image jointing/stitching. Therefore, the maximal rotation angle θ1 calculated by step S108 for rotating to the right side is smaller. On the other hand, the density of the feature points FP around the side edge of the first image IMG1 to the left side is higher, such that the overlapping portion OL2 can be relative smaller and still enough to match the basic threshold for image jointing/stitching. Therefore, the maximal rotation angle θ2 calculated by step S108 for rotating to the left side is larger. In this embodiment, the maximal rotation angles θ1 and θ2 are positively correlated to the density of the feature points FP around corresponding one of the side edges of the first image IMG1.

Figure 5:
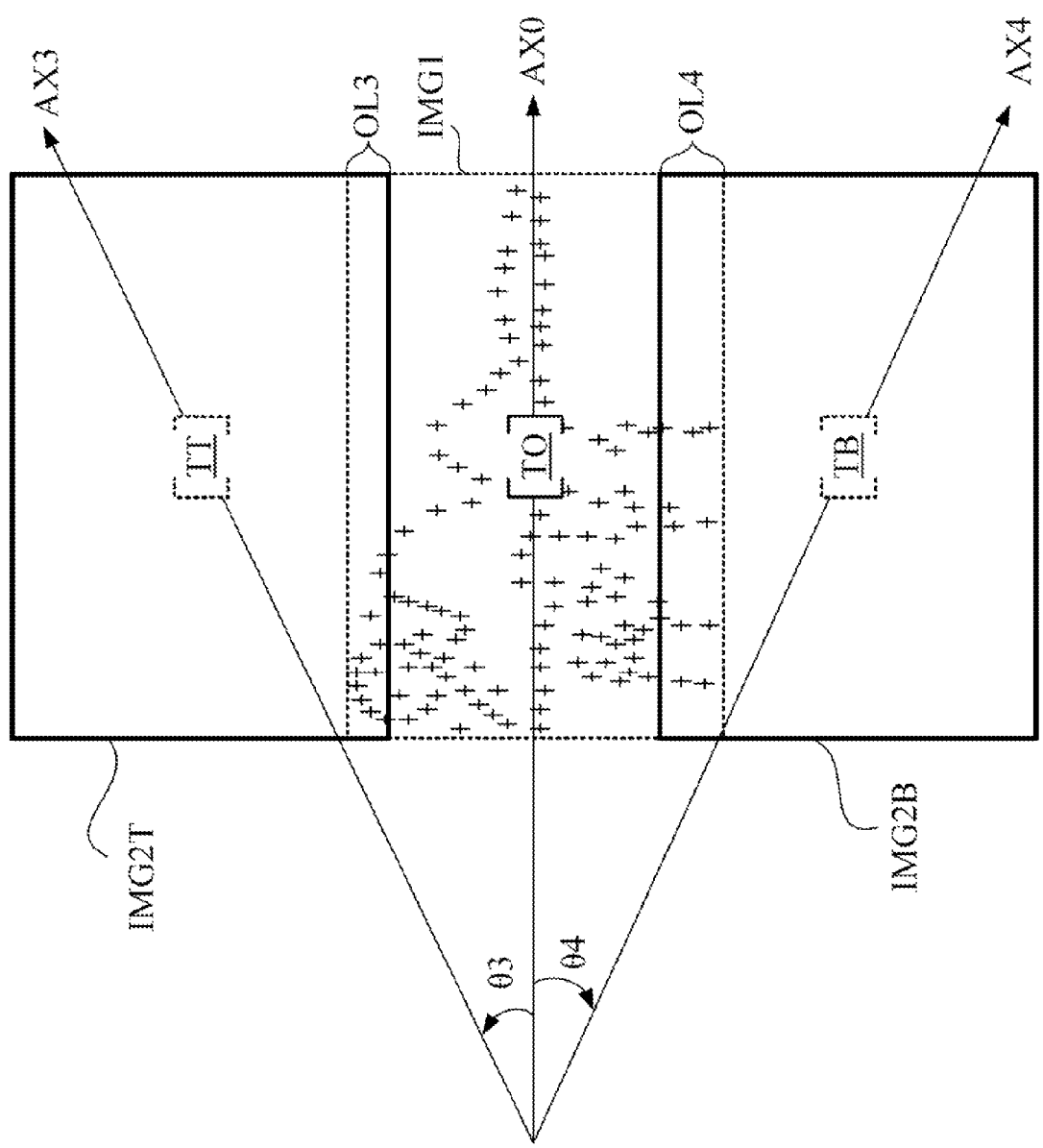
FIG. 5 is a schematic diagram illustrating the user rotates the electronic apparatus toward different directions and shoots different second images.

As aforesaid embodiment shown in FIG. 4, the image capturing method 100 and the electronic apparatus 200 can calculate different rotation angle along the horizontal rotation direction (rotating to the right side or the left side), and ensure that the overlapping portion between the second image IMG2R/IMG2L and the first image IMG1 include enough amounts of the feature points FR. However, the disclosure is not limited to the horizontal rotation direction. Reference is also made to FIG. 5, which is a schematic diagram illustrating the user rotate the electronic apparatus 200 toward different directions and shoots different second images IMG2T and IMG2B.

As shown in FIG. 5, the first image IMG1 around the side edge toward the top direction has a higher density of the feature point FP, such that a relatively small-sized overlapping portion OL3 around the top side edge is enough to match the basic threshold for image jointing/stitching. Therefore, the maximal rotation angle θ3 for rotating toward the top direction is larger. On the other hand, the first image IMG1 around the side edge toward the bottom direction has a lower density of the feature point FP, such that a relatively large-sized overlapping portion OL4 around the bottom side edge is required to match the basic threshold for image jointing/stitching. Therefore, the maximal rotation angle θ4 for rotating toward the bottom direction is smaller. In this embodiment, the maximal rotation angles θ3 and θ4 are positively correlated to the density of the feature points FP around the top side edge and bottom side edge of the first image IMG1.

Based on the embodiments shown in FIG. 4 and FIG. 5, the first image IMG1 includes many side edges. Step S108 of the image capturing method 100 is able to calculate the densities of the feature points around each of the side edges, and respectively calculates each of the maximal rotation angles corresponding to the rotation direction toward the right/left side along the horizontal direction or toward the top/bottom side along the vertical direction. Each of the maximal rotation angles is respectively positively correlated to the density of the feature points FP around each corresponding side edge.

After the calculation of the maximal rotation angle(s) is completed (i.e., step S108 is finished), the image capturing method 100 executes step S110 to prompt the maximal rotation angles θ1, θ2, θ3 and/or θ4 along specific directions (toward right, left, up or down) on the user interface through the display unit 260 of the electronic apparatus 200.

For example, when the electronic apparatus 200 shoots the first image IMG1 along the initial orientation AX0, a center of the first image IMG1 is located at the focus frame T0. When the maximal rotation angles θ1, θ2, θ3 and θ4 are calculated, the target frames TR and TL (as shown in FIG. 4) and the target frames TT and TB (as shown in FIG. 5) are obtained corresponding to the maximal rotation angles θ1, θ2, θ3 and θ4.

Afterward, the user is able to follow aforesaid prompts and rotate the orientation of the electronic apparatus 200 in the horizontal direction or the vertical direction. During the period that the user rotating the electronic apparatus 200, the image capturing method 100 executes step S112 to detect a dynamic orientation of the electronic apparatus 200 by the motion sensor 220.

Afterward, the image capturing method 100 executes step S114 for determining whether the electronic apparatus has been rotated by the maximal rotation angle (θ1, θ2, θ3 and/or θ4) along specific direction (e.g., right, left, up or down) or not according to a relative difference between the dynamic orientation and the initial orientation (referring to step S104). For example, when the dynamic orientation detected by the motion sensor 220 is the orientation AX1, the difference between the dynamic orientation AX1 and the initial orientation AX0 indicates the electronic apparatus 200 has been rotated to the right by the maximal rotation angle θ1; similarly, the differences of the orientations AX2, AX3 and AX4 relative to the initial orientation AX0 are utilized to determine the same corresponding to the maximal rotation angles θ2, θ3 and θ4.

If step S114 determines that the dynamic orientation of the electronic apparatus 200 has not matched the maximal rotation angle θ1, θ2, θ3 or θ4 along the specific direction, the image capturing method 100 returns to step S112 to keep on monitoring the dynamic orientation of the electronic apparatus 200.

If step S114 determines that the dynamic orientation of the electronic apparatus 200 has matched (or over) the maximal rotation angle θ1, θ2, θ3 or θ4 along the specific direction, the image capturing method 100 executes step S116 for shooting the second image. In some embodiments, when the dynamic orientation matches one of the maximal rotation angles along one specific direction, the electronic apparatus 200 is triggered automatically to shoot the second image without further user instructions, so as to elevate the efficiency of manipulating. As shown in FIG. 4, when the maximal rotation angle θ1 is matched, the second image IMG2R will be shot automatically; when the maximal rotation angle θ2 is matched, the second image IMG2L will be shot automatically. As shown in FIG. 5, when the maximal rotation angle θ3 is matched, the second image IMG2T will be shot automatically; when the maximal rotation angle θ4 is matched, the second image IMG2B will be shot automatically.

The first image IMG1 and the second image IMG2R, IMG2L, IMG2T or IMG2B are configured to be jointed as the panorama image.

In an embodiment, the image capturing method 100 further executes a step of jointing/stitching the second image IMG2R, IMG2L, IMG2T or IMG2B to the first image IMG1, so as to form the panorama image. In addition, the panorama image is not limited to be generated from only two images. The image capturing method 100 can be repeated in a loop to capture and joint three, four or more images into the one panorama image in order to cover a wider visual angle. The repeated loop for three or more images can be understood from aforesaid embodiment demonstrating the example of two images, and not further discussed here. It is noticed that, after two images are jointed, the image capturing method 100 is configured to find out an updated distribution of the feature points of the jointed image, and calculate new maximal rotation angles around new side edges of the jointed image according to the updated distribution. In addition, the images captured in multiple shoots are not limited to rotate the electronic apparatus 200 along the same rotation direction. For example, after the first image is captured, it is possible that the next image is captured by rotating to the right side, then another image is captured by rotating to the top, and then one another image is captured by rotating to the right side again.

Furthermore, the image capturing method 100 is not limited to joint/stitch the images right after the images are captured. In another embodiment, the image capturing method 100 is configured to shoot a series of images (two, three or more images) in sequence and then joint/stitch the series of image at once. Or in another embodiment, the image capturing method 100 is configured to joint/stitch the images after the user has captured all of the images in the whole series.

Furthermore, during the period that the electronic apparatus 200 is rotated by the user, the motion sensor 220 is configured to monitor the dynamic orientation of the electronic apparatus 200. In the meantime, a dynamic pre-view frame is reflected on the user interface of the display unit 260, and the dynamic pre-view frame will show a center focus point of the dynamic orientation. When the user rotates the electronic apparatus 200 to the right side and approaches to the maximal rotation angle θ1, the target frame TR will appear on the user interface. According to the prompted target frame TR on the user interface, the user is able to aim the center focus point toward the target frame TR, and it ensure that the electronic apparatus 200 is precisely rotated to the predetermined maximal rotation angle θ1. Similarly, the same mechanics help the user to rotate along other directions as well. The target frame TL, the target frame TT and the target frame TB are utilized to prompt the user to rotate the electronic apparatus 200 precisely by the predetermined maximal rotation angles θ2, θ3 and θ4.

Based on aforesaid embodiments, the image capturing method, the panorama image generating method and the electronic apparatus are capable of calculating the distribution of the feature points on the current image, and acquiring maximal rotation angles toward different directions according to the distribution of the feature points around edges of the current image toward different directions. It helps the user to rotate the electronic apparatus to the optimal position, to ensure the outcome of the jointed result, and to form the panorama image with the largest perspective coverage by less times of image capturing.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image capturing method, suitable for an electronic apparatus, the image capturing method comprising:
    calculating a plurality of feature points within a first image shot by the electronic apparatus, wherein the first image includes one or more objects;
    calculating a maximal rotation angle of the electronic apparatus rotating along a direction according to a distribution of the feature points within the first image, wherein the maximal rotation angle of the electronic apparatus rotating along the direction is calculated according to a density of the feature points around a side edge of the first image corresponding to the direction, and the maximal rotation angle is positively correlated to the density of the feature points around the side edge; and shooting a second image automatically when the electronic apparatus has been rotated by the maximal rotation angle along the direction;

wherein the first image is captured by the electronic apparatus when the electronic apparatus is at an initial orientation, and the feature points correspond to at least boundaries of each of said one or more objects in the first image at the initial orientation, wherein when said one or more objects comprises a plurality of objects, the objects comprise both animate and inanimate objects.

2. The image capturing method of claim 1, wherein the maximal rotation angle is calculated by counting a number of the feature points covered by an overlapping portion between the first image and the second image scheduled to be shot and keeping the number of the feature points covered by the overlapping portion of the first image above a threshold value.

3. The image capturing method of claim 1, wherein the first image comprises a plurality of side edges, the image capturing method calculates a plurality of maximal rotation angles of the electronic apparatus rotating along horizontal directions toward left and right or vertical directions toward up and down respectively according to the densities of the feature points around the corresponding side edges, and each of the maximal rotation angles is positively correlated to the density of the feature points around corresponding one of the side edges.

4. The image capturing method of claim 1, further comprising:
obtaining the initial orientation of the electronic apparatus when the first image is shot;
detecting a dynamic orientation of the electronic apparatus; and
determining whether the electronic apparatus has been rotated by the maximal rotation angle along the direction or not according to a relative difference between the dynamic orientation and the initial orientation.

5. The image capturing method of claim 1, wherein after the maximal rotation angle is calculated, the image capturing method further comprising:
prompting the maximal rotation angle along the direction on a user interface of the electronic apparatus.

6. The image capturing method of claim 1, wherein the first image and the second image are configured to be jointed as a panorama image.

7. An electronic apparatus, comprising:
a motion sensor configured for sensing an orientation of the electronic apparatus;
an image capturing unit;
a display unit configured for displaying a user interface; and
a processing unit coupled with the motion sensor, the image capturing unit and the display unit,
wherein, in response to the image capturing unit shoots a first image, the processing unit is configured for calculating a plurality of feature points within the first image, calculating a maximal rotation angle of the electronic apparatus rotating along a direction according to a distribution of the feature points within the first image, and prompting a relative position of the maximal rotation angle on the user interface, wherein the first image includes one or more objects,
in response to the motion sensor detects that the electronic apparatus has been rotated by the maximal rotation angle along the direction, the processing unit is configured for driving the image capturing unit to shoot a second image, the first image and the second image are configured to be jointed as a panorama image;
wherein the maximal rotation angle of the electronic apparatus rotating along the direction is calculated according to a density of the feature points around a farthest side edge of the first image in the direction, and the maximal rotation angle is positively correlated to the density of the feature points around said farthest side edge;
wherein the first image is captured by the image capturing unit when the electronic apparatus is at an initial orientation, and the feature points correspond to at least boundaries of each of said one or more objects in the first image at the initial orientation, wherein when said one or more objects comprises a plurality of objects, the objects comprise both animate and inanimate objects.

8. The electronic apparatus of claim 7, wherein the motion sensor detects a dynamic orientation of the electronic apparatus, the processing unit utilizes a relative difference between the dynamic orientation and the initial orientation to determine whether the electronic apparatus has been rotated by the maximal rotation angle along the direction or not.

9. The electronic apparatus of claim 7, wherein the motion sensor comprises at least one from a gyro sensor, an electronic compass and a gravity sensor.

10. A panorama image generating method, suitable for an electronic apparatus, the panorama image generating method comprising:
calculating a plurality of first feature points within a first image shot by the electronic apparatus, wherein the first image includes one or more objects;
calculating a first maximal rotation angle of the electronic apparatus rotating along a first direction according to a first distribution of the first feature points within the first image;
shooting a second image automatically when the electronic apparatus has been rotated by the first maximal rotation angle along the first direction; and
jointing the first image and the second image as a first panorama image;
wherein the first maximal rotation angle of the electronic apparatus rotating along the first direction is calculated according to a density of the first feature points around a side edge of the first image corresponding to the first direction, and the first maximal rotation angle is positively correlated to the density of the first feature points around the side edge of the first image;
wherein the first image is captured by the electronic apparatus when the electronic apparatus is at an initial orientation, and the feature points correspond to at least boundaries of each of said one or more objects in the first image at the initial orientation, wherein when said one or more objects comprises a plurality of objects, the objects comprise both animate and inanimate objects.

11. The panorama image generating method of claim 10, further comprising:
calculating a plurality of second feature points within the first panorama image;
calculating a second maximal rotation angle of the electronic apparatus rotating along a second direction according to a second distribution of the second feature points within the first panorama image;

shooting a third image automatically when the electronic apparatus has been rotated by the second maximal rotation angle along the second direction; and jointing the third image and the first panorama image as a second panorama image.

12. The panorama image generating method of claim 11, wherein the second maximal rotation angle of the electronic apparatus rotating along the second direction is calculated according to a density of the second feature points around a side edge of the first panorama image corresponding to the second direction, and the second maximal rotation angle is positively correlated to the density of the second feature points around the side edge.

13. The panorama image generating method of claim 12, wherein the second maximal rotation angle is calculated by counting a number of the second feature points covered by an overlapping portion between the first panorama image and the third image scheduled to be shot and keeping the number of the feature points covered by the overlapping portion of the first panorama image above a threshold value.

14. The panorama image generating method of claim 11, wherein the first panorama image comprises a plurality of side edges, the image capturing method calculates a plurality of second maximal rotation angles of the electronic apparatus rotating along horizontal directions toward left and right or vertical directions toward up and down respectively according to the densities of the second feature points around the corresponding side edges, and each of the maximal rotation angles is positively correlated to the density of the second feature points around corresponding one of the side edges.

15. The panorama image generating method of claim 10, wherein the first maximal rotation angle of the electronic apparatus rotating along the first direction is calculated according to a density of the first feature points around a side edge of the first image corresponding to the first direction, and the first maximal rotation angle is positively correlated to the density of the first feature points around the side edge.

16. The panorama image generating method of claim 15, wherein the first maximal rotation angle is calculated by counting a number of the first feature points covered by an overlapping portion between the first image and the second image scheduled to be shot and keeping the number of the first feature points covered by the overlapping portion of the first image above a threshold value.

17. The panorama image generating method of claim 10, wherein the first image comprises a plurality of side edges, the image capturing method calculates a plurality of first maximal rotation angles of the electronic apparatus rotating along horizontal directions toward left and right or vertical directions toward up and down respectively according to the densities of the first feature points around the corresponding side edges, and each of the first maximal rotation angles is positively correlated to the density of the first feature points around corresponding one of the side edges.

18. The panorama image generating method of claim 11, wherein after the first maximal rotation angle or the second maximal rotation angle is calculated, the image capturing method further comprising:

prompting the first maximal rotation angle or the second maximal rotation angle on a user interface of the electronic apparatus.

19. The electronic apparatus of claim 7, wherein the processing unit extracts the feature points from the first image by using an edge detection algorithm.

* * * * *